(12) United States Patent
Aoki

(10) Patent No.: US 6,379,282 B1
(45) Date of Patent: Apr. 30, 2002

(54) VEHICULAR TRANSMISSION CONTROL SYSTEM

(75) Inventor: Akihira Aoki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 09/608,002

(22) Filed: Jun. 30, 2000

(30) Foreign Application Priority Data

Jul. 13, 1999  (JP) .......................................... 11-198482

(51) Int. Cl.$^7$ ............................................... B60K 41/12
(52) U.S. Cl. ......................... 477/109; 477/44; 477/110; 477/112
(58) Field of Search ................................ 477/107, 109, 477/110, 112, 113, 37, 44

(56) References Cited

U.S. PATENT DOCUMENTS

| | | | | |
|---|---|---|---|---|
| 4,653,007 A | * | 3/1987 | Osanai et al. .................. | 701/54 |
| 5,681,238 A | * | 10/1997 | Minowa et al. ......... | 477/107 X |
| 5,947,861 A | * | 9/1999 | Nobumoto .................... | 477/37 |
| 6,104,976 A | * | 8/2000 | Nakamura .................. | 477/107 |
| 6,190,284 B1 | * | 2/2001 | Kuroda et al. .............. | 477/107 |

* cited by examiner

*Primary Examiner*—Charles A Marmor
*Assistant Examiner*—Ha Ho
(74) *Attorney, Agent, or Firm*—Armstrong, Westerman & Hattori, LLP

(57) ABSTRACT

An electronic control unit ECU controls a shift thrust Ft applied to a variable width drive pulley through a control valve CV and makes the rotational speed Ne of the engine follow a target engine rotational speed Neo to vary the speed change ratio of a continuously variable transmission CVT. In this control, the shift thrust Ft is achieved as sum of a proportional term P and an integral term I, where the proportional term P is determined on the basis of the deviation DNe of the engine rotational speed Ne from the target engine rotational speed Neo, and the integral term I is determined as cumulative sum of the deviation. When the throttle of the engine is closed, the integral term is set larger than when the throttle is open.

6 Claims, 13 Drawing Sheets

VEHICULAR TRANSMISSION CONTROL SYSTEM

BACKGROUND OF THE INVENTION

The present invention relates generally to a vehicular transmission which comprises a continuously variable transmission that varies the speed change ratio of the transmission continuously and transmits the driving force output from the engine to the drive wheels of a vehicle.

1. Field of the Invention

Swash plate type transmissions, which utilize a fluid for speed change control, and V-belt type transmissions are well known as continuously variable transmissions incorporated in vehicular transmissions. Such a vehicular transmission incorporating a continuously variable transmission provides a high driving quality for a vehicle because the rotational speed of the engine is controlled to follow a target engine rotational speed which is determined to change the speed change ratio continuously so as to match the condition of the vehicle to the momentary expectation of the driver.

2. Description of the Related Art

As an example of such transmission, there is a transmission which is designed to eliminate engine idling for fuel efficiency. In this transmission, when the throttle of the engine is closed while the vehicle is driving, the fuel supply to the engine is terminated to decelerate the vehicle and to stop the engine when the vehicle is brought into a halt. Generally, such a transmission is controlled to achieve a LOW speed change ratio before the vehicle comes into a complete halt, so that the vehicle can be started smoothly after the restart of the engine.

However, such transmissions are known to experience an undesirable phenomenon that the response of the actual engine rotational speed to follow the target engine rotational speed tends to become slow as the speed of the vehicle decreases. It is difficult to maintain a certain rotational speed for the engine while the speed change ratio of the transmission is being adjusted to a LOW ratio. If the transmission or the control system of the transmission is arranged not to perform an idling elimination control for a condition where the speed change ratio does not decrease to a LOW ratio while the engine rotational speed has decreased to a predetermined rotational speed, then the fuel supply to the engine is started again when the engine rotational speed has decreased. If this situation is repeated, then a level of fuel efficiency originally desired for the transmission is not achieved.

The speed change ratio can be controlled in accordance to a control value which is achieved as the sum of a proportional term and an integral term, where the proportional term is a product of the deviation of the engine rotational speed from the target engine rotational speed multiplied by a gain for this proportional term, and the integral term is a cumulative sum of proportional terms multiplied by a gain for this integral term (for example, in a V-belt type continuously variable transmission, this control value corresponds to the magnitude of the thrust which acts to change the pitch radii of the pulleys for varying the speed change ratio). There is a method which makes the above mentioned gain for the proportional term larger, thereby making the engine rotational speed come close to the target engine rotational speed as quickly as possible while the vehicle is driving at a slow speed. However, this method is likely to be affected by a hunting which is caused by the engine rotational speed chasing the target engine rotational speed. As a result, this irregular engine speed deteriorates the riding quality of the vehicle.

SUMMARY OF THE INVENTION

To solve such a problem, the present invention provides a control system for a vehicular transmission which system is capable of bringing the speed change ratio to a LOW ratio with a certain engine rotational speed without impairing riding quality while the vehicle is decelerating.

In order to achieve this objective, the present invention provides a control system for a power transmission which is used for driving a vehicle. This power transmission comprises an engine and a continuously variable transmission which conveys the driving force with a speed change from the engine to wheels of the vehicle, and the control system comprises idling elimination control means and speed change control means. The idling elimination control means functions to stop the engine when the vehicle is brought into a halt, and the speed change control means calculates a target engine rotational speed in consideration of the driving condition of the vehicle and varies the speed change ratio of the continuously variable transmission such that the rotational speed of the engine will follow the target engine rotational speed. While the vehicle is driving with the throttle of the engine being closed, the control system terminates fuel supply to the engine and directs the speed change control means to vary the speed change ratio to a substantially LOW ratio. In this case, the speed change control means makes the rotational speed of the engine follow the target engine rotational speed at a faster speed than that applied when the throttle is open.

With this control system, while the vehicle is decelerated without fuel supply to the engine, the speed of the engine rotational speed to follow the target engine rotational speed is controlled to be faster than when the throttle is open, so the transmission is ensured to be shifted into a LOW ratio without any delay even while the vehicle is driving at a low speed. Preferably, after the speed change ratio is shifted quickly to a substantially LOW ratio by the speed change control means, the vehicle comes to a halt, and then while maintaining the state of non fuel supply to the engine, the control system directs the idling elimination control means to stop the engine.

Therefore, this control system is advantageous in fuel efficiency even in a transmission which is arranged not to perform idling elimination but to restart the fuel supply to the engine if the speed change ratio is not at a LOW ratio when the engine rotational speed has decreased to a predetermined rotational speed. The reason is that the speed change ratio is adjusted quickly to a LOW ratio as described above, so the actual frequency of the fuel supply restart decreases. Therefore, shocks which may occur in relation to the restart of the fuel supply are also less frequent, so the riding quality of the vehicle is improved.

It is preferable that the speed change control means control the speed change operation of the continuously variable transmission by generating a control value (for example, the shift thrust Ft of an embodiment described in the following section) which is a sum of a proportional term and an integral term. Here, the proportional term is determined on the basis of the deviation of the rotational speed of the engine from the target engine rotational speed, and the integral term is determined on the basis of the cumulative sum of the deviation. In this control, when the throttle is closed while the vehicle is driving, the integral term is set to a larger value than when the throttle is open. As the control value is adjusted in this way by increasing only the integral term without any increase of the proportional term, it is possible to make the engine rotational speed follow the target engine rotational speed with no occurrence of hunting, thus maintaining a good riding quality for the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
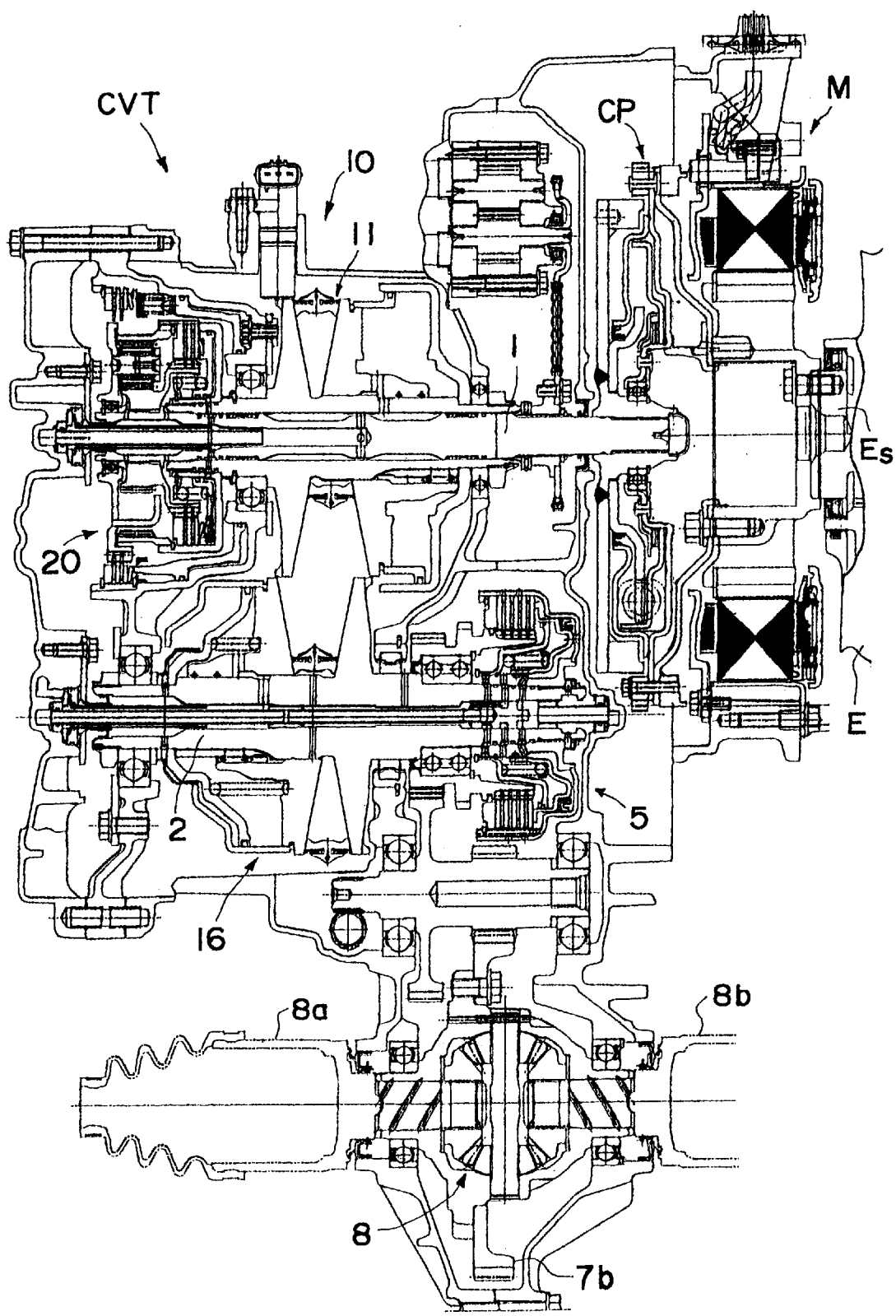
FIG. 1 is a cross-sectional view of a vehicular transmission which incorporates a control system according to the present invention.
Figure 2:
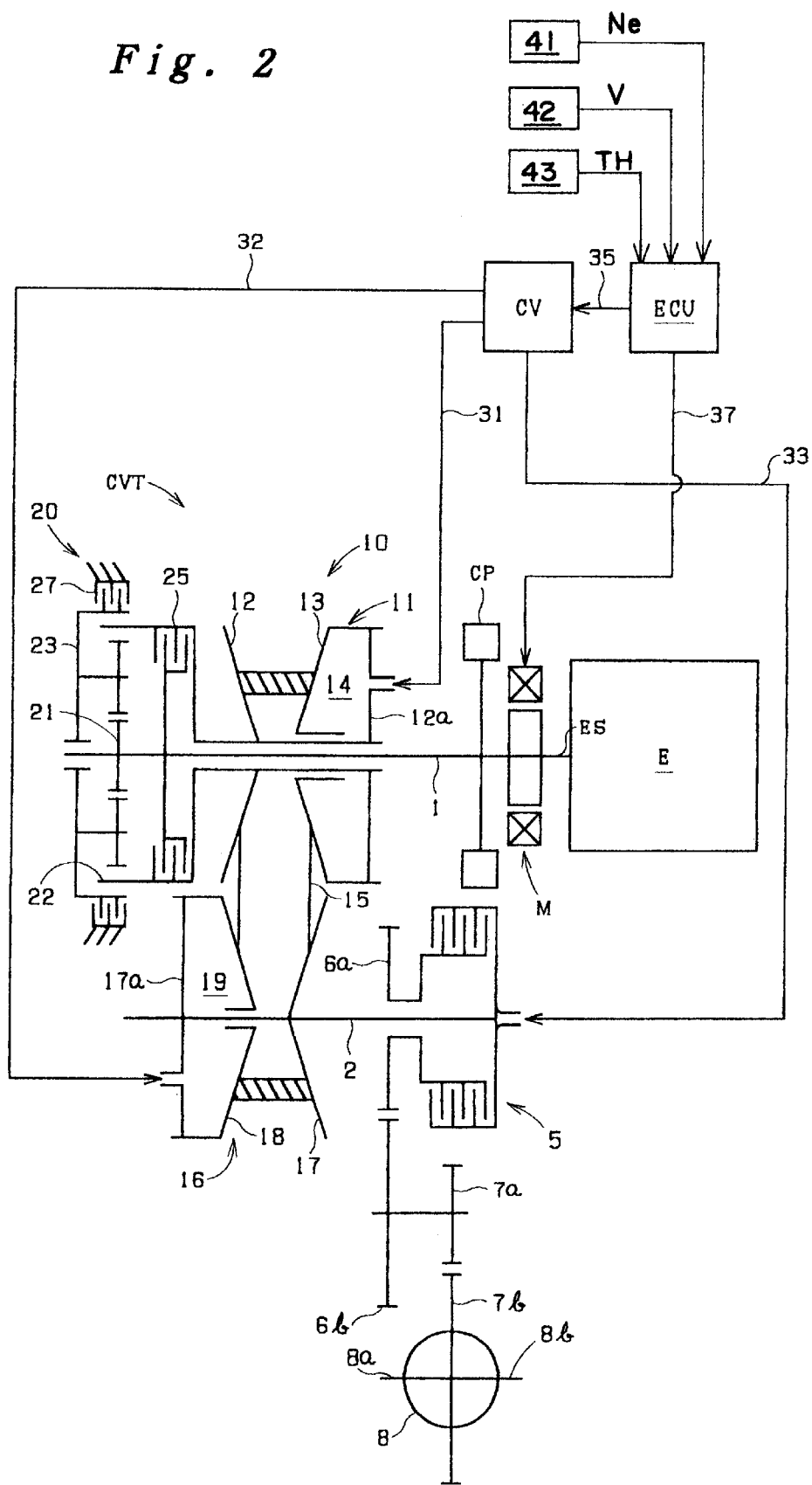
FIG. 2 is a schematic diagram showing the construction of the power transmission mechanism of this transmission.
Figure 3:
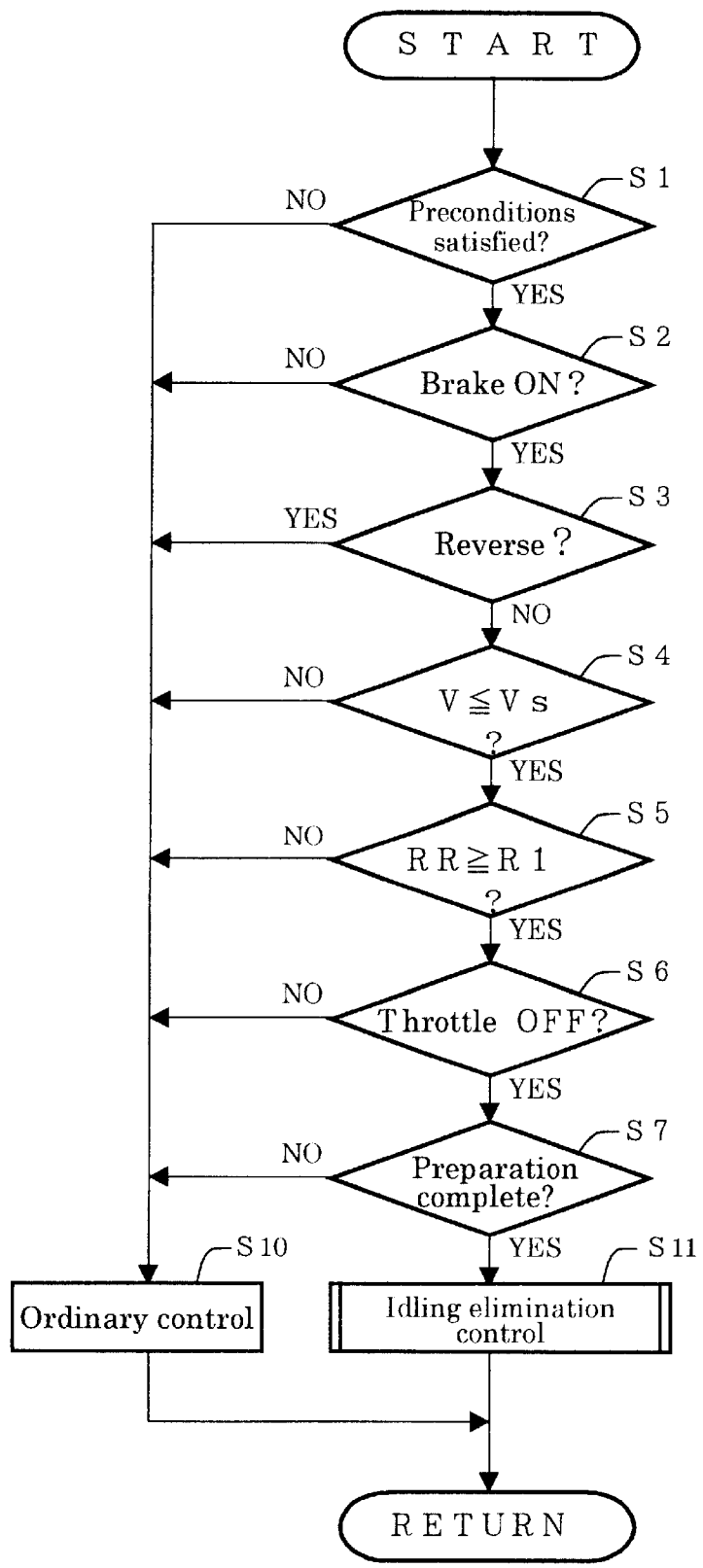
FIG. 3 is a flowchart showing some steps of an idling elimination control according to the present invention, which control is effective when the transmission is operated to decelerate.

FIG. 1 is a cross-sectional view of a vehicular transmission which incorporates a control system according to the present invention. FIG. 2 shows the construction of the power transmission mechanism of this vehicular transmission, which comprises an engine E, an electrical motor M, and a continuously variable transmission CVT. The electrical motor M is disposed over the output shaft Es of the engine while the continuously variable transmission CVT is connected through a coupling mechanism CP to the engine output shaft Es. The engine E is a fuel injection engine, so the injection of fuel into the engine is terminated when the vehicle decelerates as described in detail later in this section. The electrical motor M is powered by a battery which is mounted on the vehicle, and the electrical motor assists the driving force of the engine. In this way, the vehicular transmission is constructed as a hybrid transmission with these two power sources.

The continuously variable transmission CVT comprises a metal V-belt mechanism 10, a forward/reverse switching mechanism 20 and a starting clutch (or main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to the differential mechanism 8 and then used for driving axle shafts 8a and 8b to rotate the right and left wheels of the vehicle (not shown).

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the outside of the movable pulley half 13, a drive-pulley cylinder chamber 14 is defined by a cylinder wall 12a which is fixed to the stationary pulley half 12. The pressure supplied through a control valve CV and through an oil passage 31 into the cylinder chamber 14 (this pressure is referred to as "drive pulley pressure") generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the outside of the movable pulley half 18, a driven-pulley cylinder chamber 19 is defined by a cylinder wall 17a which is fixed to the stationary pulley half 17. The pressure supplied through the control valve CV and through an oil passage 32 into the cylinder chamber 19 (this pressure is referred to as "driven pulley pressure") generates a thrust which shifts the movable pulley half 18 in the axial direction of the driven pulley.

In this construction, the control system controls the hydraulic pressures which are supplied into these cylinder chambers 14 and 19, respectively, (the side thrusts of the drive and driven pulleys) by the control valve CV to generate appropriate lateral thrusts in these two pulleys. Specifically, the system, while preventing any slip of the belt 15, adjusts the difference between the pressures supplied to the drive and driven pulleys, so that the side thrusts generated in the respective pulleys change the widths of the V grooves of the drive and driven pulleys 11 and 16. Thereby, the pitch radii of the respective pulleys for the V belt 15 are changed to vary the speed change ratio of the transmission continuously.

Furthermore, the forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when this forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction).

The starting clutch 5 is a clutch to control the power transmission between the countershaft 2 and the output members of the transmission, i.e., gears 6a, 6b, 7a and 7b. When the starting clutch 5 is engaged, the power is transmitted therebetween. In the condition where the starting clutch 5 is engaged, the output of the engine, after undergoing the speed change by the metal V-belt mechanism 10, is transmitted through the gears 6a, 6b, 7a and 7b to the differential mechanism 8 and then divided and transmitted by the differential mechanism 8 to the right and left wheels. When the starting clutch 5 is released, this power transmission is terminated, and the transmission comes into a neutral condition. The engagement of the starting clutch 5 is carried out by a pressure supplied through the control valve CV and through an oil passage 33 (this pressure is referred to as "clutch control pressure").

In the continuously variable transmission CVT, the drive and driven pulley pressures supplied through the control valve CV and through the oil passages 31 and 32, respectively, are used for the speed change control while the clutch control pressure supplied through the control valve CV and through the oil passage 33 is used for the actuation of the starting clutch. The control valve CV itself is controlled by means of control signals sent from an electronic unit ECU.

In the vehicle incorporating this transmission, the electrical motor M assists the engine E such that the engine E can operate in a range which is most fuel efficient. To improve the fuel efficiency of the vehicle, the operation of the electrical motor M is controlled by means of control signals which are sent from the electronic control unit ECU through a line 37.

As shown in FIG. 2, the control system of the transmission further comprises an engine rotational speed detector 41, which detects the rotational speed Ne of the engine, a vehicle speed detector 42, which detects the speed V of the vehicle, and a throttle opening detector 43, which detects the degree of the opening of the throttle TH to the engine E (i.e., the condition of the opening and closing of the throttle). With this arrangement, the electronic control unit ECU calculates a target engine rotational speed Neo based on the vehicle speed V detected by the vehicle speed detector 42 and the throttle opening TH detected by the throttle opening detector 43, and it controls the continuously variable transmission CVT to change the speed change ratio thereof to make the engine rotational speed Ne follow the target engine rotational speed Neo (specifically, it controls the thrust required for varying the speed change ratio). In this way, the engine E can be operated in a range which is most fuel efficient.

To further improve the fuel efficiency of this transmission, the control system additionally performs an idling elimination control. Basically, this idling elimination control is to stop the operation of the engine when the vehicle stops, and when the driving force of the engine becomes unnecessary, i.e, the engine enters into an idling condition. However, to achieve a higher level of fuel efficiency, this system goes further than this basic control. Specifically, the system controls the transmission to terminate the fuel supply to the engine if the accelerator pedal is released to decelerate and to stop the vehicle, for preventing the engine from idling.

Now, this idling elimination control, which is executed on condition that the fuel injection is terminated to decelerate the vehicle, is described in reference to the flowcharts shown in FIGS. 3~6.

This control begins at Step S1, where a judgment is made to find out whether a precondition for the idling elimination control is satisfied or not. As preconditions, for example, the temperature of the oil in the transmission must be above a predetermined value so as not to cause any retardation in responsive actions, and the slope regression inhibitor of the transmission is in good condition. If such preconditions are not satisfied, then the control routine proceeds to Step S10 to control the engine in an ordinary way. In other words, if the preconditions for the termination of the fuel injection are not satisfied, then the control resumes the fuel injection control. The above mentioned slope regression inhibitor functions to retain an enough hydraulic pressure for the brake to keep the vehicle stationary on a slope even while the driver is not depressing the brake pedal.

If the judgment at Step S1 is that the preconditions are satisfied, then the control routine proceeds to Step S2, where a determination is made whether the brake of the vehicle is on or off, i.e., the brake pedal is depressed or not. If the brake is off, then the control routine proceeds to Step S10 to perform the ordinary drive control. On the other hand, if the brake is on, then the control proceeds to Step S3, where a determination is made whether the transmission is in the reverse drive range or not. The idling elimination control is executed only while the transmission is in the forward drive range. Therefore, if the determination indicates that the transmission is in the reverse drive range, then the control routine proceeds to Step S10 to perform the ordinary drive control. On the other hand, if the transmission is not in the reverse drive range, then the control routine proceeds to Step S4, where a determination is made whether the speed V of the vehicle is equal to or lower than a predetermined speed Vs (e.g., 15 km/h) or not. The idling elimination control is a control which is executed when the vehicle is being stopped. Therefore, if the vehicle is not driving at a low speed, the control routine proceeds to Step S10 to perform the ordinary drive control.

When the speed of the vehicle decreases below the predetermined speed, the control routine proceeds to Step S5, where a determination is made whether the reduction ratio RR of the transmission is equal to or greater than a predetermined reduction ratio R1 (LOW ratio) or not. The idling elimination control is executed to stop the engine, so if the engine is stopped, then the speed change ratio cannot be changed thereafter. Therefore, it is necessary that the speed change ratio be adjusted to a LOW ratio before the start of the idling elimination control, so that the vehicle can be started smoothly after the restart of the engine. Thus, the predetermined reduction ratio R1 is a ratio (=2.2) near the LOW ratio (=2.4), and the determination at Step S5 is to determine whether the reduction ratio of the transmission has become a ratio near the LOW ratio or not. Until such a ratio is achieved, the control routine proceeds to Step S10 to perform the ordinary drive control. When such a ratio is achieved, the control routine proceeds to Step S6, where a determination is made whether the throttle of the engine is closed completely or not. If the throttle is open, i.e., the accelerator pedal is depressed by the driver, then the control routine proceeds to Step S10 to perform the ordinary drive control, and the idling elimination control is not executed because the driver is judged having no intention to stop the vehicle.

As described above, only if the preconditions are satisfied, the brake is on, the transmission is not in the reverse drive range, the vehicle is driving at a speed lower than the predetermined speed, the reduction ratio is almost at the LOW ratio, and the throttle is closed completely, then the idling elimination control is executed. However, before the idling elimination control, further determinations are made at Step S7 whether preparations for the idling elimination control are complete or not. Here, for example, if the air conditioner of the vehicle is on or not, if there is enough charge in the battery or not, and if the negative pressure used to assist the operation of the brake is at an appropriate level or not are determined. If the air conditioner is on, if the battery do not have enough charge, or if the negative pressure for assisting the brake is short, then the control routine proceeds to Step S10 to perform the ordinary drive control. On the other hand, if these preparations are judged complete, then the control routine proceeds to Step S11, where the control transits to the idling elimination control.

Figure 4:
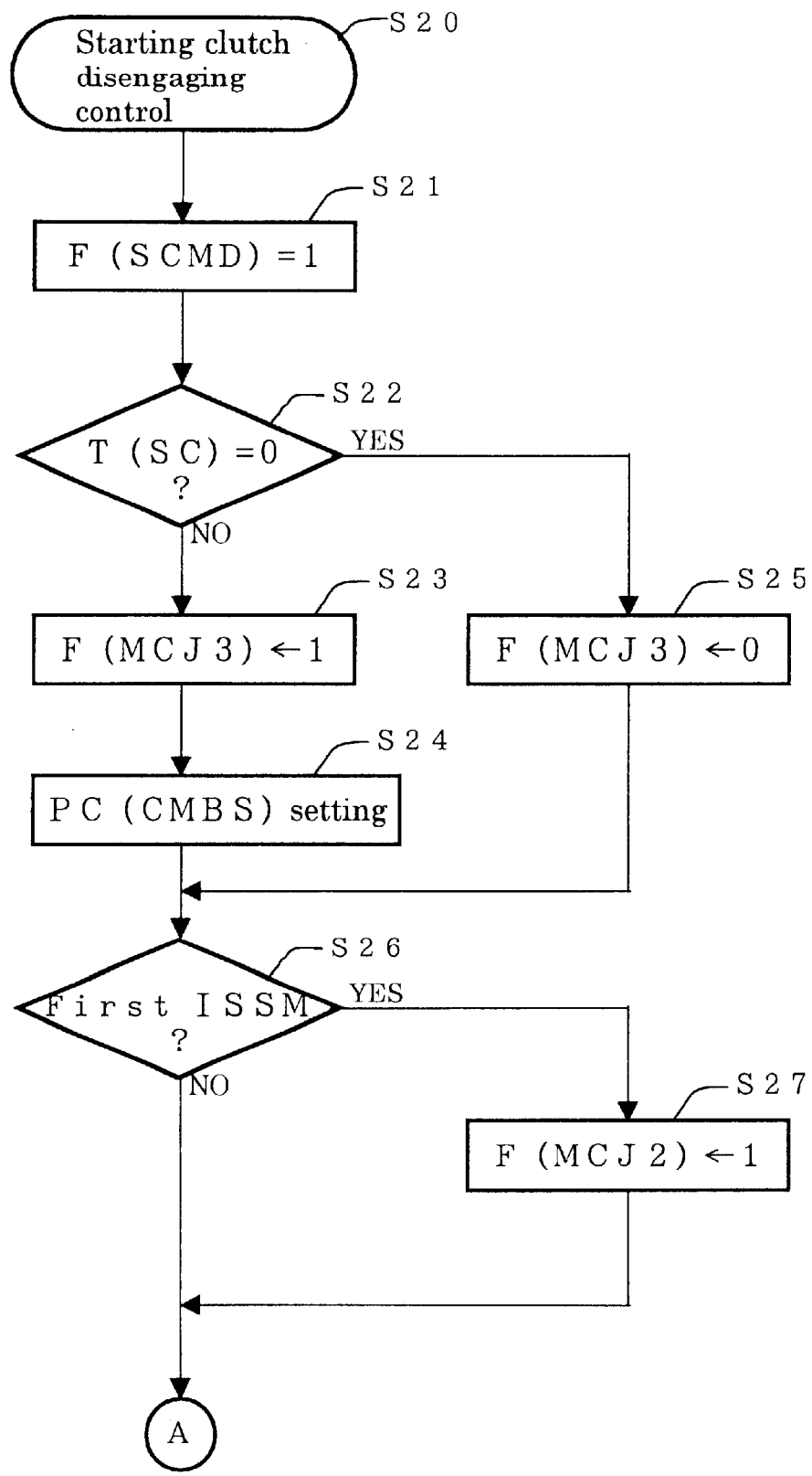
FIG. 4 is another flowchart showing further steps of the idling elimination control.
Figure 5:
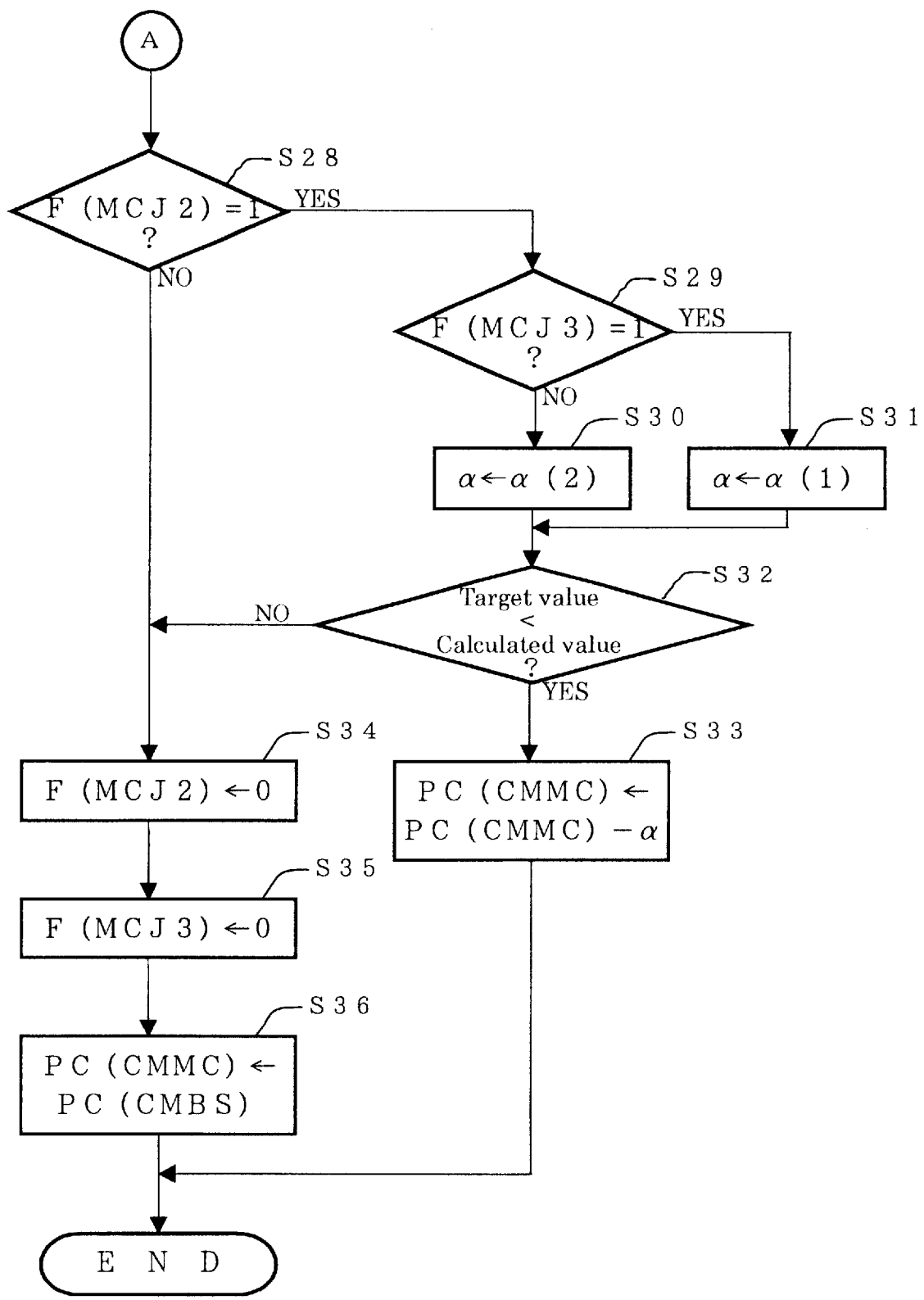
FIG. 5 is another flowchart showing still further steps of the idling elimination control.
Figure 6:
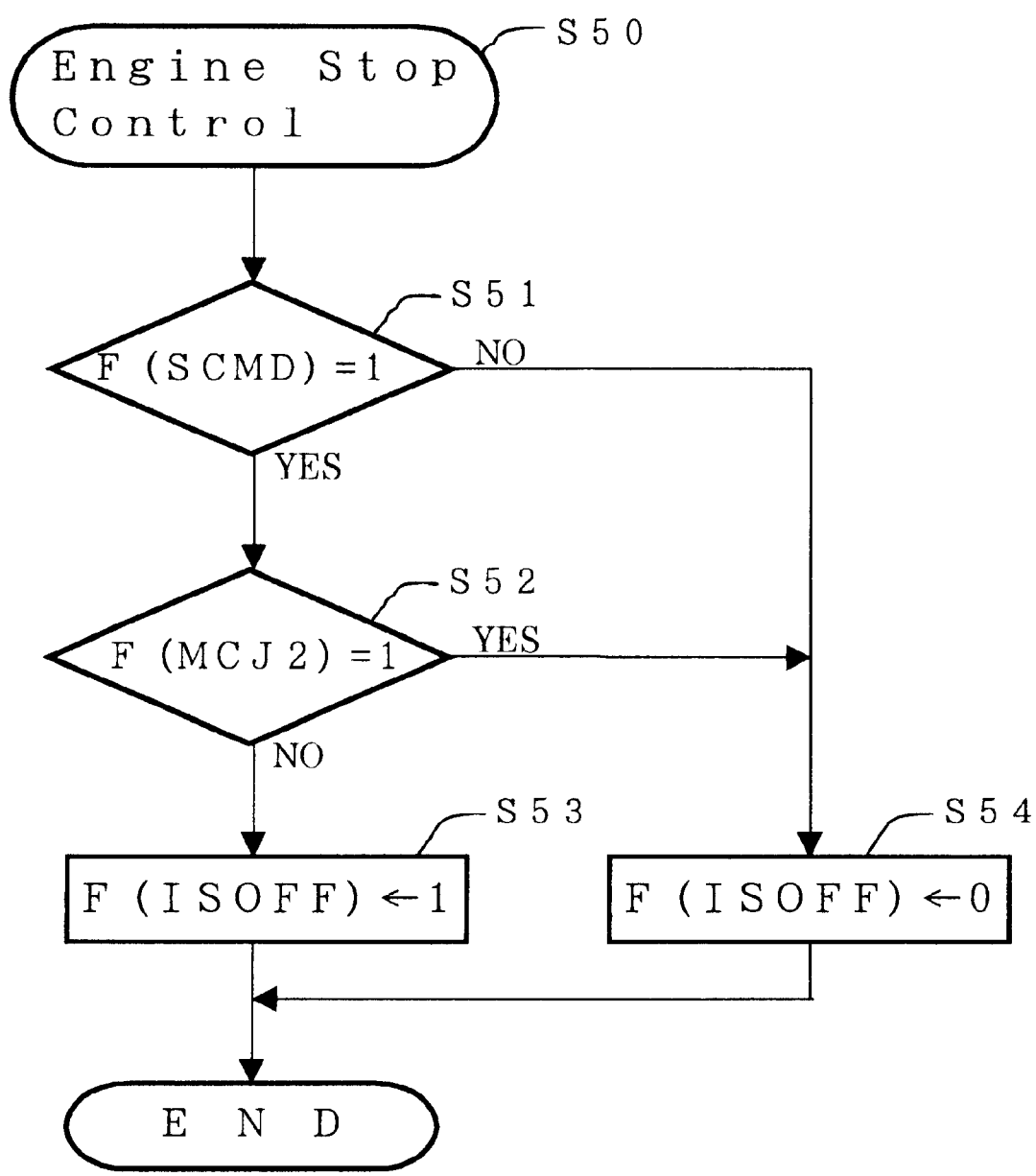
FIG. 6 is another flowchart showing yet further steps of the idling elimination control.

The idling elimination control comprises a starting clutch disengaging control S20 shown in FIGS. 4 and 5 (the circled "A" of the flowchart in FIG. 4 connects with that of FIG. 5, making up a continuous flowchart) and an engine stop control S50 shown in FIG. 6.

At first, a description is given of the starting clutch disengaging control S20. In this control, firstly, a starting clutch off mode selection flag is set up, F(SCMD)=1, at Step S21 to indicate that the control flow has arrived at Step S11. This flag is used as a judgment flag in the engine stop control shown in FIG. 6. Next, at Step S22, a determination is made whether the torque capacity of the starting clutch 5 has become zero, T(SC)=0, or not. If it is not zero, T(SC)≠0, then the control routine proceeds to Step S23, where a clutch gradual release flag is set up F(MCJ3)=1. Then, at Step S24, a target clutch pressure PC(CMBS) is set for the starting clutch 5. This target clutch pressure PC(CMBS) is a pressure to control the clutch so that the torque capacity of the starting clutch becomes zero, T(SC)=0. On the other hand, if the torque capacity is zero, T(SC)=0, then the control routine proceeds to Step S25, where the clutch gradual release flag is set down, F (MCJ3)=0.

Then, the control routine proceeds to Step S26, where a determination is made whether or not this is the first flow through the starting clutch disengaging control. If it is the first flow, then a disengagement control flag is set up, F(MCJ2)=1, at Step S27. It is clear from this that the disengagement control flag is set up, F(MCJ2)=1, when the starting clutch disengaging control has just started.

Then, the control routine proceeds to Step S28, where a determination is made whether the disengagement control flag is up, F(MCJ2)=1, or not. If the disengagement control flag is up, F(MCJ2)=1, then the control routine proceeds to Step S29, where a determination is made whether the clutch gradual release flag is up, F(MCJ3)=1, or not. If the clutch gradual release flag is up, F(MCJ3)=1, then a small value α(1) is set as a pressure reduction value α to reduce the clutch control pressure gradually because the starting clutch 5 needs to be released gradually. On the other hand, if the clutch gradual release flag is down, F(MCJ3)=0, then a large value α(2) (>α(1)) is set as the pressure reduction value α to reduce the clutch control pressure rapidly because the starting clutch 5 can be released quickly as the torque capacity of the clutch is zero.

At Step S32, this pressure reduction value α is subtracted from the starting clutch control pressure PC(CMMC) at the moment, and the value resulted from this subtraction is compared with the target value, i.e., the target clutch pressure PC(CMBS) set at Step S24. If the target value is smaller than the value calculated in the above subtraction, i.e., the starting clutch control pressure has not decreased to the target value, then the control routine proceeds to Step S33, where the value resulted from the subtraction of the pressure reduction value α from the current starting clutch control pressure PC(CMMC) is set as a new starting clutch control pressure to control the starting clutch.

On the other hand, if the target value is equal to or greater than the value calculated in the above subtraction, i.e., the starting clutch control pressure has decreased to the target value, then the control routine proceeds to Steps S34, S35 and S36. There, the disengagement control flag is set down, F(MCJ2)=0, at Step S34, the clutch gradual release flag is set down, F(MCJ3)=0, at Step S35, and the target clutch pressure PC(CMBS) is set as the starting clutch control pressure PC(CMMC) at Step S36. It is clear from the above description that, in the starting clutch disengaging control S20, the clutch control pressure is decreased gradually to the target clutch pressure PC(CMBS), i.e., the starting clutch 5 is released gradually.

Now, a description is given of the engine stop control S50 shown in FIG. 6. In this control, at first, a determination is made whether the starting clutch off mode selection flag is up, F(SCMD)=1, or not at Step S51. If it is down, F(SCMD)=0, which condition indicates that the above mentioned starting clutch disengaging control S20 is not being performed, then the control routine proceeds to Step S54, where an idling elimination control flag is set down, F(ISOFF)=0. In this case, the idling elimination control is not performed. On the other hand, if the starting clutch off mode selection flag is up, F(SCMD)=1, which condition indicates that the above mentioned starting clutch disengaging control S20 has been started, then the control system judges that the conditions required for stopping the engine are satisfied and allows the engine to be stopped by maintaining the stoppage of the fuel injection. Therefore, the control routine proceeds to Step S52, where a determination is made whether or not the disengagement control flag is down, F(MCJ2)=0, i.e., whether the control for releasing the starting clutch 5 gradually so as to make the torque capacity of the starting clutch 5 zero has completed or not.

If the disengagement control flag is up, F(MCJ2)=1, which condition indicates that the control for releasing the starting clutch 5 is being executed, then the control routine proceeds to Step S54, where the idling elimination control flag is set down, F(ISOFF)=0, and the idling elimination control is not yet started. If the disengagement control flag is down, F (MCJ2)=0, which condition indicates that the control for releasing the starting clutch 5 has completed, then the control routine proceeds to Step S53, where the idling elimination control flag is set up, F(ISOFF)=1, and the idling elimination control is executed. Specifically, this idling elimination control stops the engine forcibly by using the electrical motor.

In this way, the idling elimination control is executed after the fuel supply is terminated. However, the control system according to the present invention restarts the fuel supply if the speed change ratio is not at the LOW ratio when the engine rotational speed Ne has decreased to a predetermined rotational speed and does not perform the idling elimination control. In this case, the engine E is operated even after the vehicle has stopped, to ensure that the speed change ratio will be adjusted to the LOW ratio (after the LOW ratio is achieved, the engine is stopped to avoid idling).

As mentioned previously, the speed change ratio is controlled such that the engine rotational speed Ne follow the target engine rotational speed Neo. To ensure a good response for this control even while the vehicle is driving at a low speed, the electronic control unit ECU controls the shift thrust Ft or constituent of the thrust which acts to shift the variable width drive pulley 11 and the variable width driven pulley 16 for adjusting the speed change ratio. The control of this shift thrust Ft is described below in detail in reference to the flowcharts shown in FIGS. 7~14.

The shift thrust Ft is determined as sum (Ft=P+I) of a proportional term P(P=P×DNe) and an integral term I(I=Σ (Ig×P)), where the proportional term P is the product of the deviation DNe of the engine rotational speed Ne from the target engine rotational speed Neo multiplied by a proportional term gain Pg, and the integral term I is the cumulative sum of the proportional terms P multiplied by an integral term gain Ig. To calculate the shift thrust Ft, at first the proportional term gain Pg and the integral term gain Ig are calculated at Step S101 shown in FIG. 7.

Figure 8:
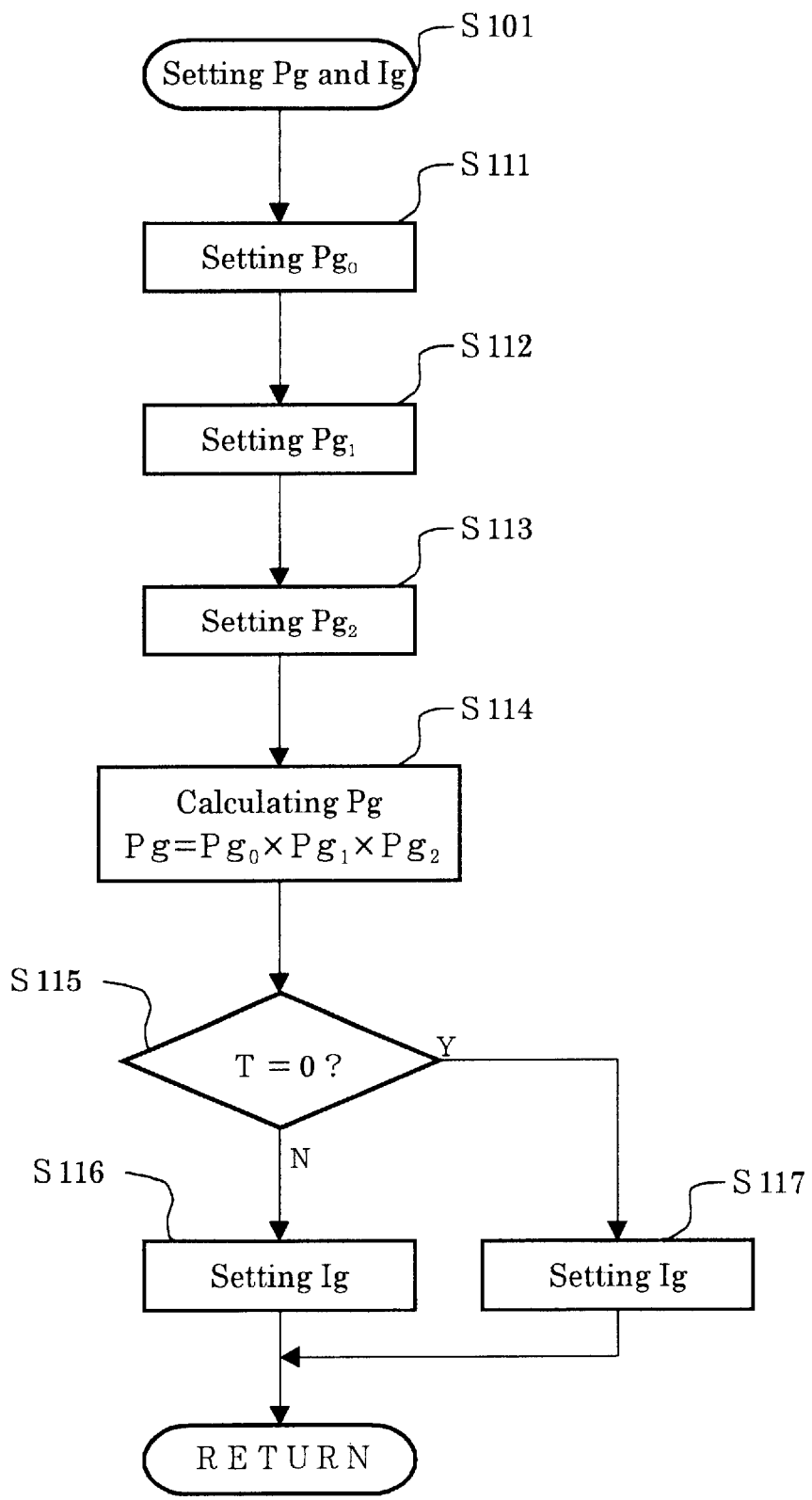
FIG. 8 is a flowchart showing steps involved in the calculations of the gain Pg for the proportional and of the gain Ig for the integral term of an equation used for control of the transmission.

FIG. 8 shows the process executed at Step S101 in detail. At first, a base value Pg0 is set for the proportional term gain Pg in correspondence to the engine rotational speed Ne, which is calculated from the rotational speed of the variable width drive pulley 11 at Step S111. The smaller the value of the engine rotational speed Ne becomes, the larger the base value Pg0 is set. The reason is that because the response of the shift thrust Ft is slow when the engine rotational speed Ne is slow, the shift thrust Ft needs to be made larger to improve the condition.

After the base value Pg0 is set at Step S111, a first correction value Pg1 is set in correspondence to the speed change ratio R at the moment at Step S112. The smaller (i.e., the closer to the OD ratio) the speed change ratio R becomes, the larger the first correction value Pg1 is set. The reason is that the need to improve the response of the speed change increases as the speed change ratio R becomes smaller (i.e., goes away from the LOW ratio). Then, a second correction value Pg2 is set in correspondence to the rate of change DR of the speed change ratio R at Step S113. The larger the rate of change DR of the speed change ratio R to the negative direction (i.e., the speed change ratio changes toward the OD ratio) becomes, the larger the second correction value Pg2 is set. After these values are set at Steps S111~S113, the base value Pg0 is multiplied by the first and second correction values Pg1 and pg2 to produce a proportional term gain Pg at Step S114.

After the calculation of the proportional term gain Pg at Step S114, a determination is made whether the throttle of the engine E is closed or not, i.e., whether the throttle opening is zero, TH=0, or not at Step S115. Here, if the throttle opening TH is judged not zero, TH≠0, meaning that the accelerator pedal is stepped down, then a normal value is set for the integral term gain Ig at Step S116. On the other hand, if the throttle opening TH is judged zero, TH=0, meaning that the accelerator pedal is not stepped down, then a value larger than the normal value is set for the integral term gain Ig at Step S117. Here, for example, if the value (the above mentioned normal value) set for the integral term gain Ig when the throttle is open is 0.006, then the value set when the throttle is closed is approximately 0.02.

Figure 9:
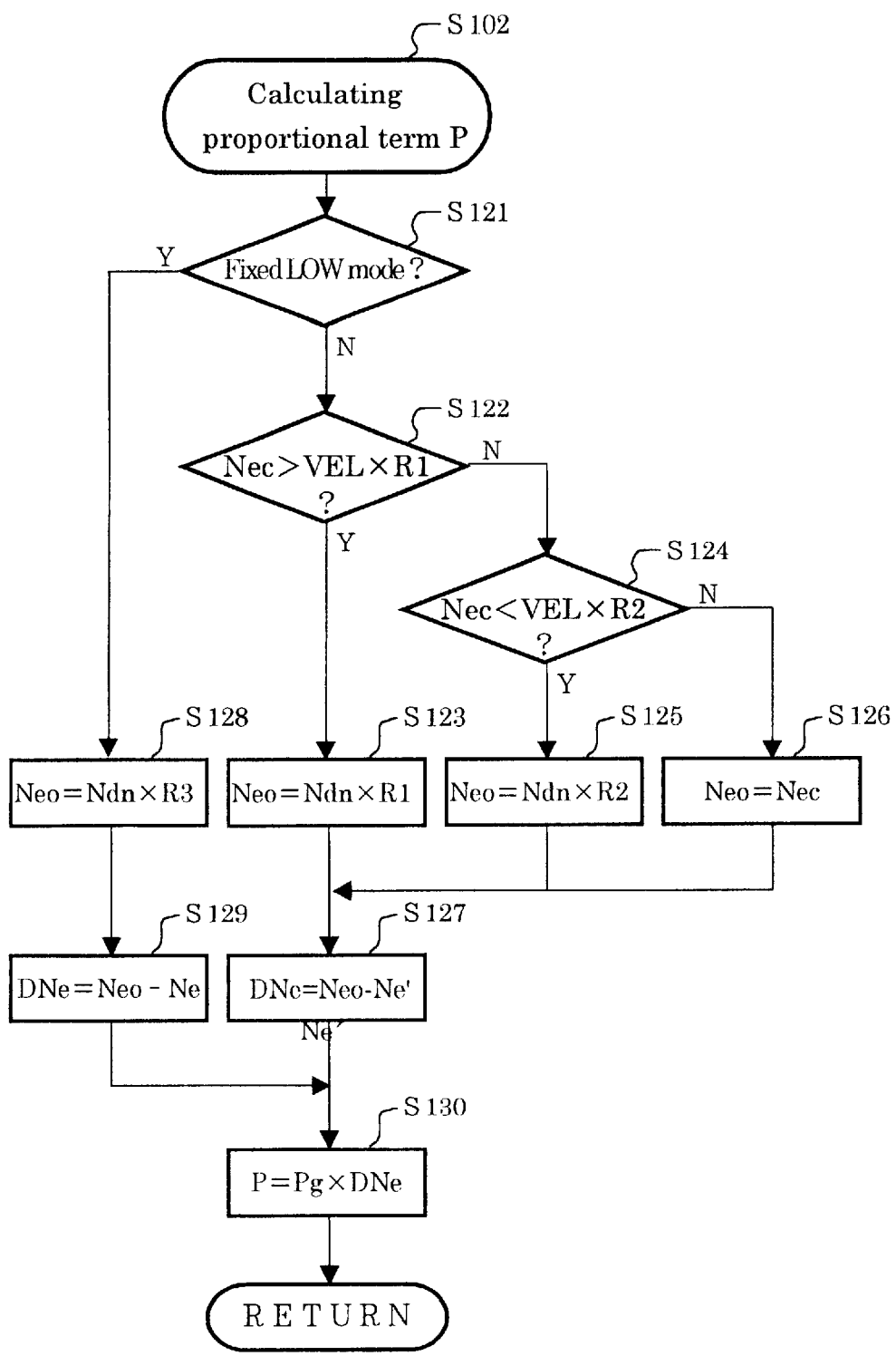
FIG. 9 is a flowchart showing steps involved in the calculation of the proportional term P.
Figure 13:
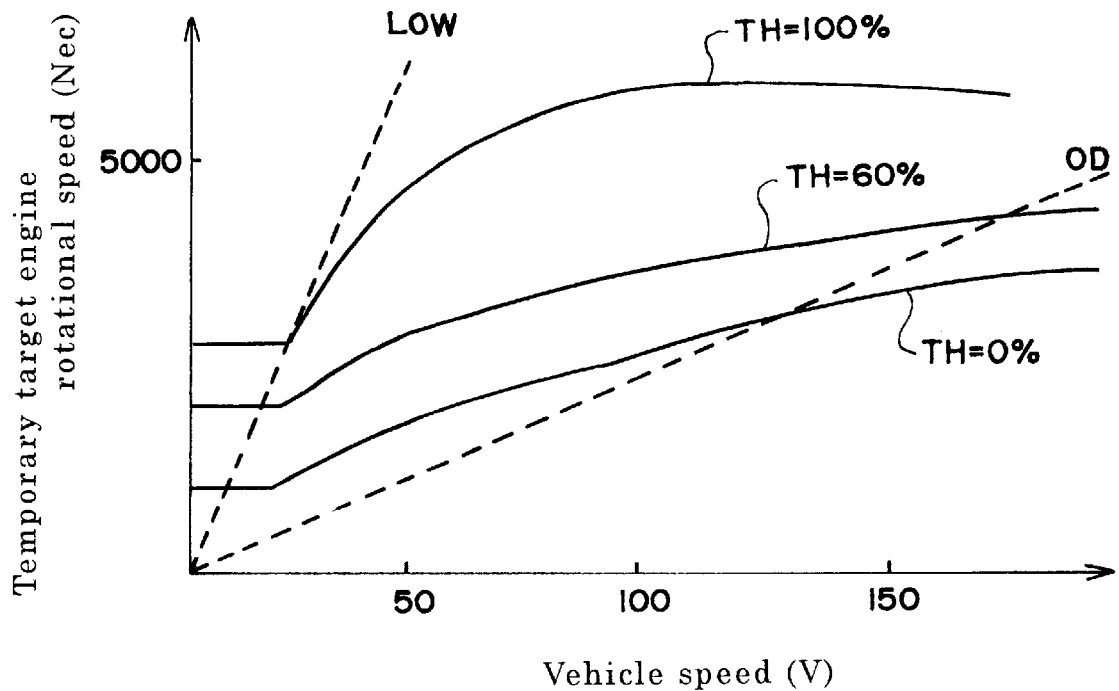
FIG. 13 is an example of graph showing relations among the speed of the vehicle V and the throttle opening TH and the temporary target engine rotational speed Nec of the transmission.

In this way, the process of Step S101 is completed, and then control routine proceeds to Step S102 (refer to FIG. 7), where the proportional term gain Pg calculated at Step S101 is used for the calculation of the proportional term P. FIG. 9 shows the process executed at Step S102 in detail. At first, a determination is made whether the transmission is in a fixed LOW mode (this mode maintains a LOW ratio when the vehicle starts or stops) or not at Step S121. Here, if the transmission is judged not in a fixed LOW mode, then the control routine proceeds to Step S122, where the temporary target engine rotational speed Nec at the moment, which is retrieved from a speed change map, for example, shown in FIG. 13, is compared with the first engine rotational speed (VEL×R1) which is the product of the starting clutch output rotational speed VEL multiplied by a speed change ratio R1 (for example, R1=2.4) that is equivalent to a LOW ratio. The temporary target engine rotational speed Nec is determined in correspondence to the vehicle speed V and the throttle opening TH in the speed change map.

If the temporary target engine rotational speed Nec is judged greater than the first engine rotational speed (VEL× R1) at Step S122, then the target engine rotational speed Neo is set to the engine rotational speed (VEL×R1) which is the product of the starting clutch output rotational speed VEL multiplied by the above mentioned speed change ratio R1 equivalent to a LOW ratio at Step S123. On the other hand, if the temporary target engine rotational speed Nec is judged smaller than the first engine rotational speed (VEL×R1) at Step S122, then the control routine proceeds to Step S124, where the temporary target engine rotational speed Nec which is retrieved from the speed change map is compared with the second engine rotational speed (VEL×R2) which is the product of the starting clutch output rotational speed VEL multiplied by a speed change ratio R2 (for example, R2=0.4) that is equivalent to an OD ratio. Here, if the temporary target engine rotational speed Nec is judged smaller than the second engine rotational speed (VEL×R2), then the target engine rotational speed Neo is set to the engine rotational speed (VEL×R2) which is the product of the starting clutch output rotational speed VEL multiplied by the above mentioned speed change ratio R2 equivalent to an OD ratio at Step S125. On the other hand, if the temporary target engine rotational speed Nec is judged greater than the second engine rotational speed (VEL×R2) at Step S124, then the temporary target engine rotational speed Nec as it is is set as the target engine rotational speed Neo at Step S126.

After the processes executed at Steps S123, S125 and S126, the deviation DNe of the engine rotational speed Ne from the target engine rotational speed Neo is calculated by subtraction. For the calculation of the deviation DNe, a slip factor σ (for example, 1.03) which affects the rotational transmission between the starting clutch 5 and the variable width driven pulley 16 is taken into consideration, and the rotational speed Ne' (=Ne×σ) which is the product of the engine rotational speed Ne multiplied by the slip factor σ is used for the calculation of the deviation DNe (DNe=Neo− Ne') at Step S127.

Figure 7:
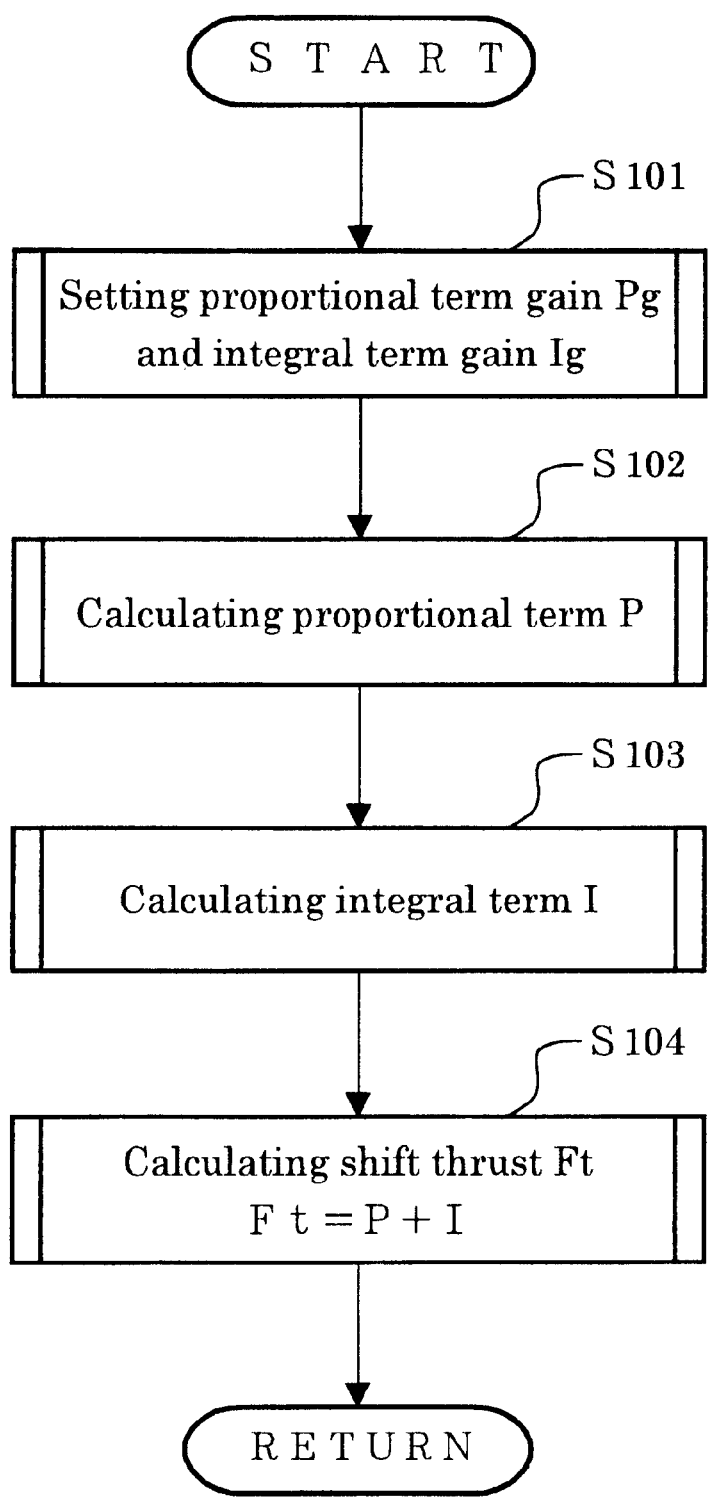
FIG. 7 is a flowchart showing steps involved in the calculation of the shift thrust of the transmission.

If the transmission is judged being in a fixed LOW mode at Step S121, then the target engine rotational speed Neo is set to the third engine rotational speed (Ndn×R3) which is the product of the rotational speed Ndn of the variable width driven pulley 16 multiplied by a speed change ratio R3 that is equivalent to an LOW ratio at Step S128. Then, the deviation DNe is calculated by subtracting the engine rotational speed Ne from this target engine rotational speed Neo at Step S129. The determination of the third engine rotational speed executed at Step S128 uses no speed change map, and the target engine rotational speed Neo is determined directly without referring to the vehicle speed V. Therefore, it is not necessary to consider the slip factor σ, so the deviation DNe is calculated by subtracting the engine rotational speed Ne as it is from the target engine rotational speed Neo, DNe=Neo−Ne, at Step S129. After the calculation of the deviation DNe at Step S127 or Step S129, this deviation DNe is multiplied by the proportional term gain Pg achieved at Step S101 to produce a proportional term P, P=Pg×DNe, at Step S130. As a result, the process calculating the proportional term P which process is arranged for Step S102 in FIG. 7 is completed.

After completing the process at Step S102, the control routine proceeds to Step S103 (refer to FIG. 7), where the integral term I is calculated from the integral term gain Ig achieved at Step S101 and the proportional term P achieved at Step S102. Now, the process executed at Step S103 is described in detail in reference to FIG. 10. At first, a determination is made on the basis of the speed change mode whether the integral term I (which was set last time) is to be reset or not at Step S131. The process executed at this step is detailed in FIG. 11. At first, a determination is made whether the transmission has been in a fixed LOW mode or not at Step S141. Here, if the transmission is judged to have been in a fixed LOW mode, then the integral term I is reset at Step S142. On the other hand, if the transmission is judged to have not been in a fixed LOW mode, then the control routine proceeds to Step S143, where a determination is made whether the transmission is in a kickdown mode or not.

At Step S143, if the transmission is judged being in a kickdown mode, then the integral term I is reset at Step S142. On the other hand, if the transmission is judged not being in a kickdown mode, then the control routine proceeds to Step S144, where another determination is made whether the transmission is in a manual shift down mode or not. If the transmission is judged being in a manual shift down mode, then the integral term I is reset at Step S142. On the other hand, if the transmission is judged not being in a manual shift down mode, then the integral term I is not reset. In other words, while the vehicle is driving at a substantially constant speed, the integral term I is maintained as it is. However, if the driving condition is changing, then the integral term I is reset.

Figure 10:
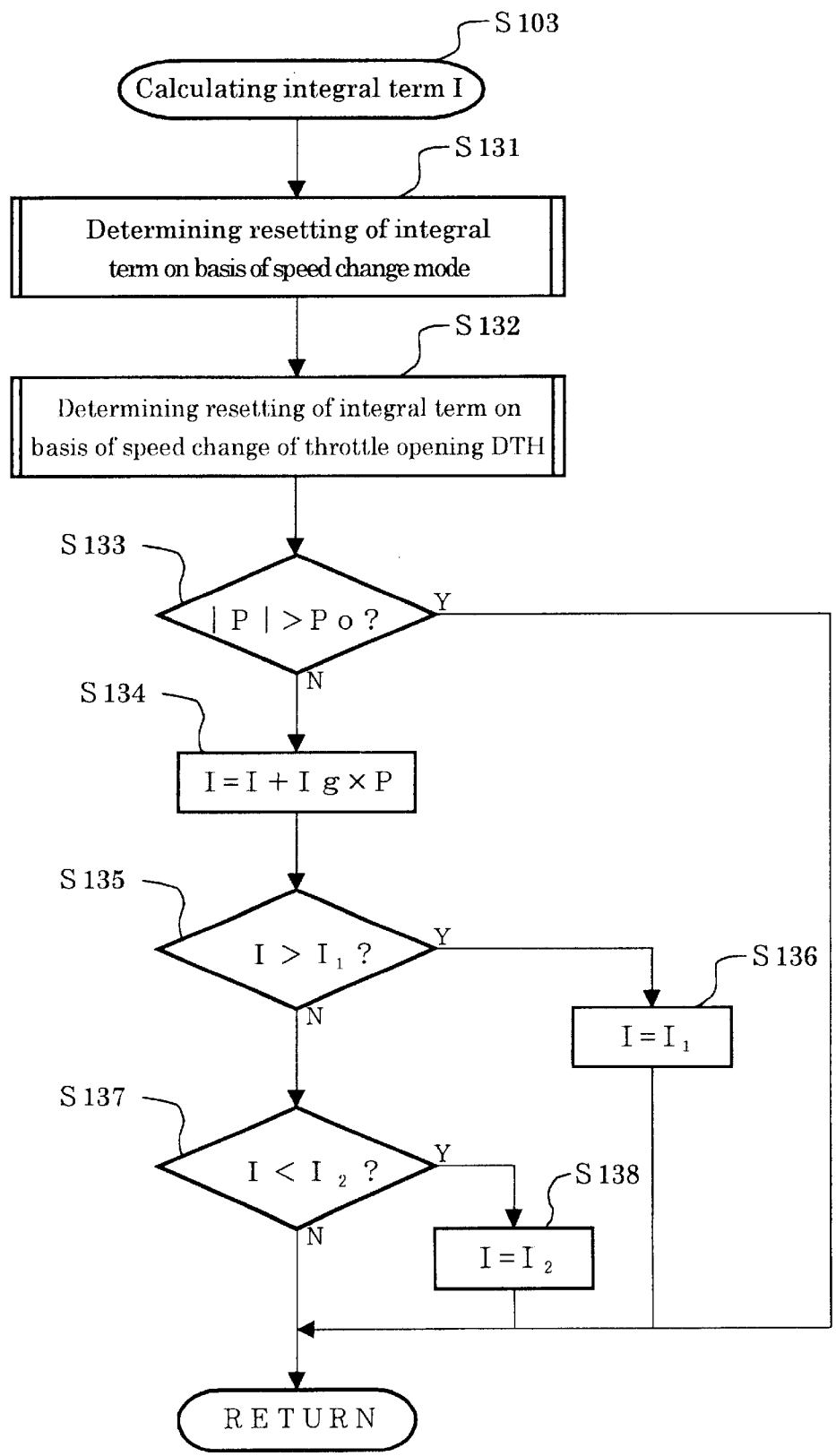
FIG. 10 is a flowchart showing steps involved in the calculation of the integral term I.
Figure 11:
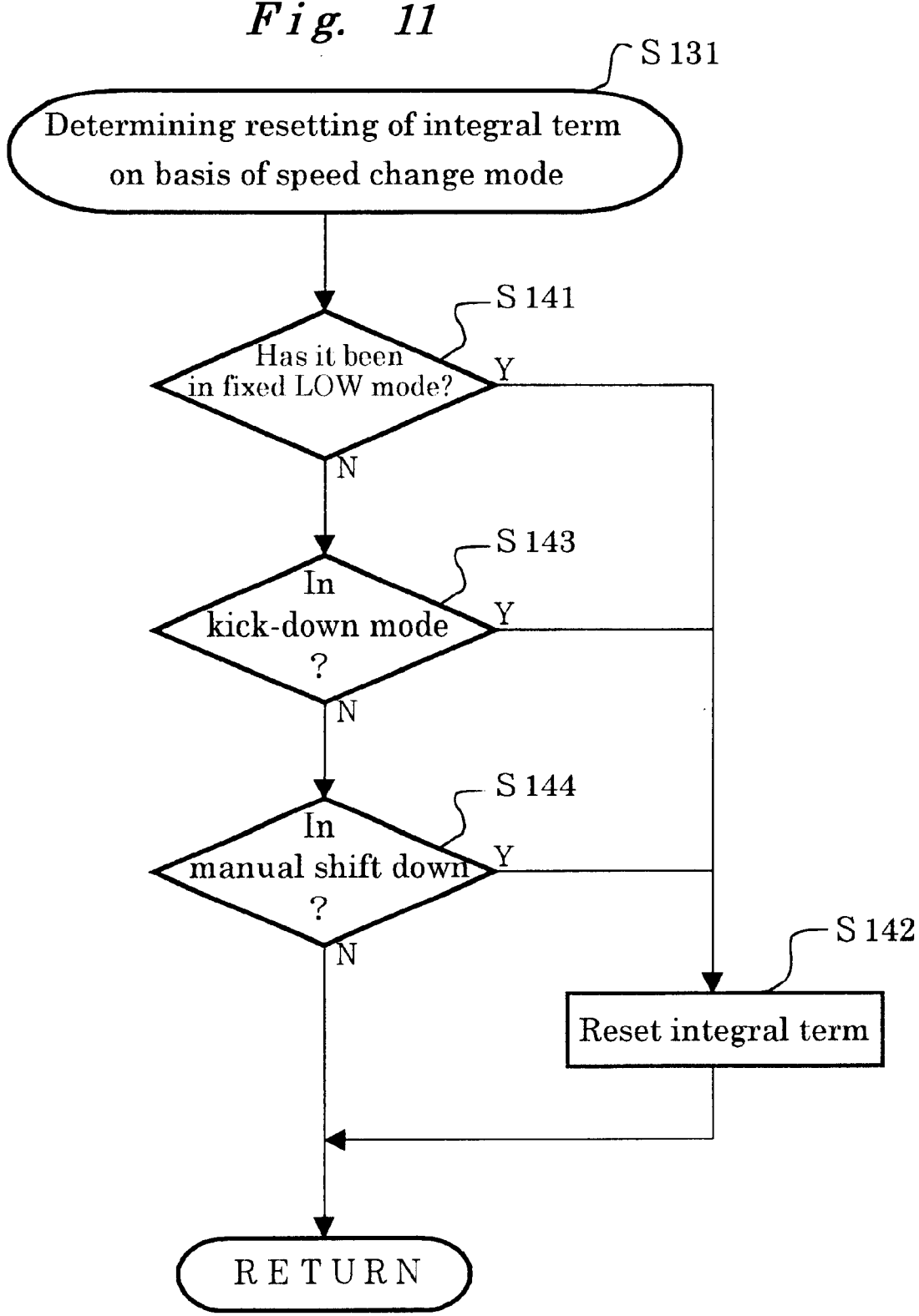
FIG. 11 is a flowchart showing steps involved in a determination which considers the condition mode of the speed change mechanism for resetting the integral term I.
Figure 12:
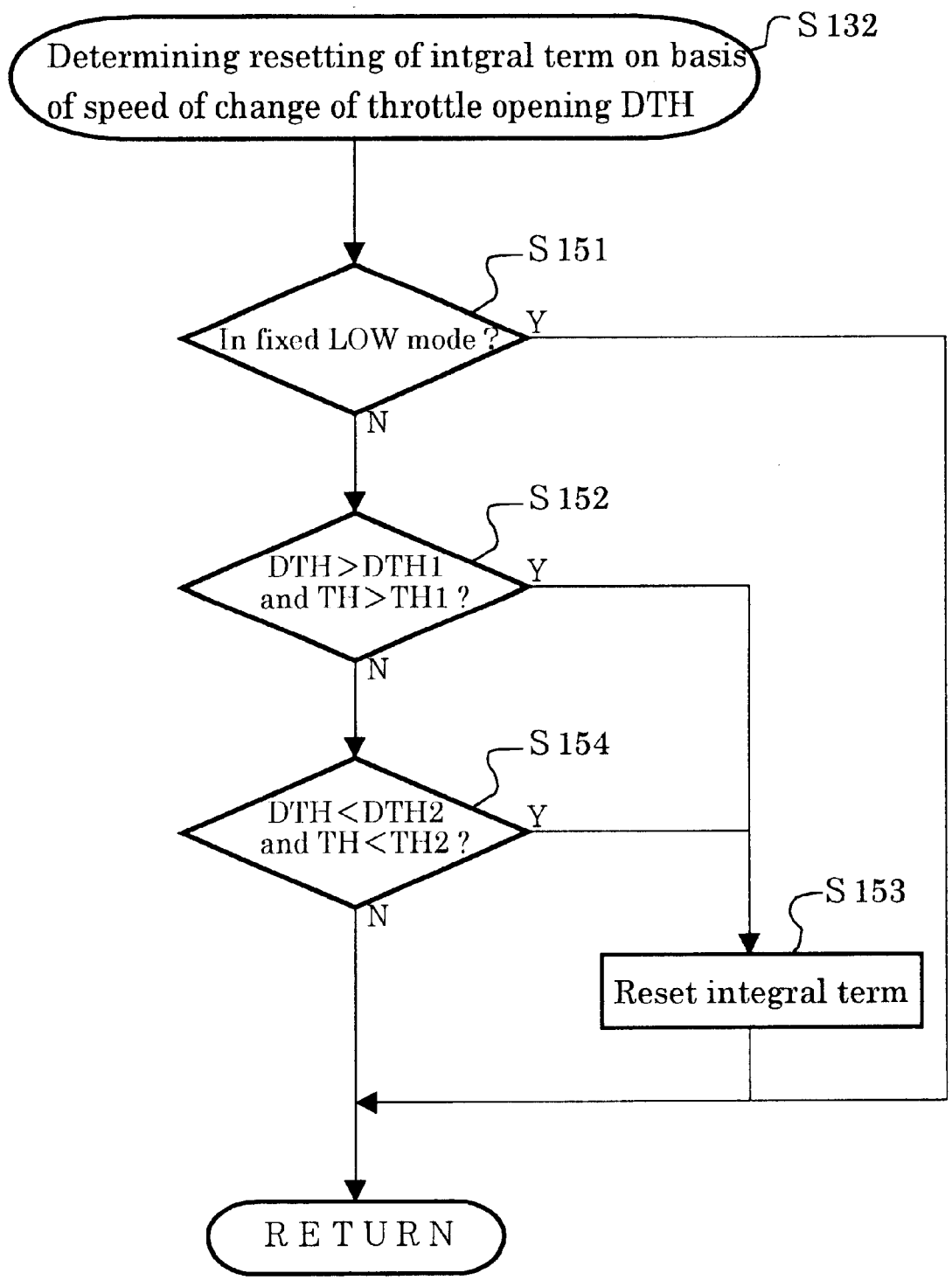
FIG. 12 is a flowchart showing steps involved in a determination which considers the speed of change of the throttle opening of the transmission for resetting the integral term I.

After the completion of the process executed at Step S131 in FIG. 10, another determination is made on the basis of the speed of change of the throttle opening TH whether the integral term I is to be reset or not at Step S132. The process executed at this step is detailed in FIG. 12. At first, a determination is made whether the transmission is in a fixed LOW mode at the moment or not at Step S151. Here, if the transmission is judged being in a fixed LOW mode, then the control routine returns without resetting the integral term I. On the other hand, if the transmission is judged not being in a fixed LOW mode, then the control routine proceeds to execute another determination to find out whether the accelerator pedal is stepped downward at a speed faster than a predetermined speed or not. In other words, this process executed at Step S152 determines whether or not the speed of change DTH of the throttle opening TH is greater than a positive reference value DTH1, and whether or not the throttle opening TH after the change is greater than a predetermined reference value TH1.

If the above mentioned conditions are judged being satisfied at Step S152, then the integral term I is reset at Step S153. On the other hand, if the result of the determination is that these conditions are not satisfied, then the control routine proceeds to execute another determination to find out whether the accelerator pedal is returned upward or released at a speed faster than a predetermined speed or not. In other words, this process executed at Step S154 determines whether or not the speed of change DTH of the throttle opening TH is smaller than a negative reference value DTH2, and whether or not the throttle opening TH after the change is smaller than a predetermined reference value TH2. If these conditions are judged being satisfied, then the integral term I is reset at Step S153. On the other hand, if these conditions are judged not being satisfied, then the control routine returns without resetting the integral term I.

After the completion of the process executed at Step S132, the control routine proceeds to Step S133 (refer to FIG. 10), where a determination is made whether the value (absolute value) of the proportional term P achieved at Step S102 is greater than a predetermined reference value P0 or not. Here, if the value of the proportional term P is judged greater than the reference value P0, then the process executed at Step S103 completes without calculating the integral term I. On the other hand, if the value of the proportional term P is judged equal to or smaller than the reference value P0, then the control routine proceeds to Step S134, where the integral term gain Ig achieved at Step S101 is multiplied by the proportional term P achieved at Step S102, and this product is added cumulatively to the integral term I to calculate a new integral term I (in other words, this process is an integration).

Then, upper and lower limitation checks are performed on this integral term I. Firstly, a determination is made whether the integral term I achieved at Step S134 is greater than a predetermined upper value I1 or not at Step S135. If the integral term I is greater than the upper value I1, then the integral term I is set to the upper value I1 at Step S136. On the other hand, if the integral term I is equal to or smaller than the upper value I1, then the lower limitation check is performed. Specifically, a determination is made whether the integral term I achieved at Step S134 is smaller than a predetermined lower value I2 or not at Step S137. If the integral term I is smaller than the lower value I2, then the integral term I is set to the lower value I2 at Step S138. On the other hand, if the integral term I is equal to or greater than the lower value I2, then the integral term I is left as it is, and the process executed at Step S103 completes.

Then, the control routine proceeds to Step S104 shown in FIG. 7, where the shift thrust Ft is calculated as sum of the proportional term P achieved at Step S102 and the integral term I achieved at Step S103 (Ft=P+I). The shift thrust Ft achieved in this way is used for the control of the variable width drive pulley 11 so as to control the speed change ratio of the continuously variable transmission CVT. The adjustment of the variable width driven pulley 16 is carried out in correspondence with the movement of the variable width drive pulley 11.

Thus, in this transmission, while the vehicle is decelerating with termination of fuel supply, the speed of the engine rotational speed Ne to follow the target engine rotational speed Neo (follow-up speed) is greater when the throttle of the engine E is closed (throttle opening TH=0) than when the throttle is open (throttle opening TH≠0) because the integral term gain Ig is set to a larger value (refer to Step S116 and to Step S117) for the condition where the throttle is closed. With this control, the transmission is controlled into a LOW ratio without any delay and without fail even while the vehicle is driving at a low speed.

In this control, the transmission can maintain a predetermined engine rotational speed at the LOW ratio. Therefore, this control system is advantageous in fuel efficiency even though it is arranged to restart fuel supply if the speed change ratio is not at a LOW ratio when the engine rotational speed Ne has decreased to the predetermined rotational speed. The reason is that the actual frequency of restarting the fuel supply decreases. Therefore, shocks which may occur in relation to the restart of the fuel supply will be also less frequent, so the riding quality of the vehicle will increase. As the control system of the present invention ensures that the speed change ratio be set to a LOW ratio before the vehicle comes into a halt, the vehicle can be started again smoothly. Moreover, in this control, only the integral term gain Ig is increased to control the shift thrust Ft while the proportional term gain Pg is not increased (or only the integral term I is increased while the proportional term P is not increased). Because of this, there is no hunting of the engine rotational speed Ne for the target engine rotational speed Neo, so the riding quality of the vehicle is improved.

Figure 14:
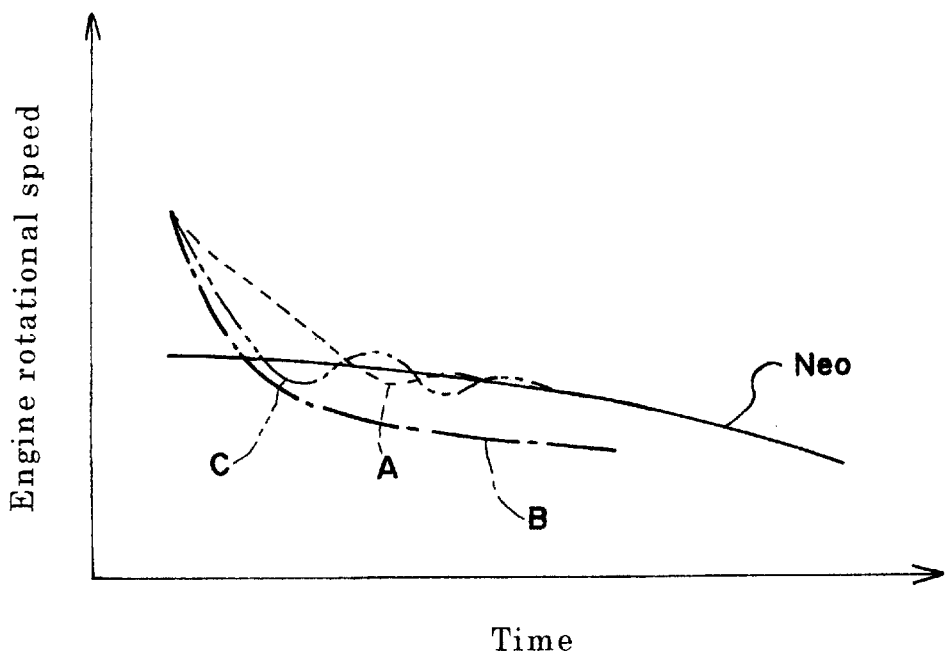
FIG. 14 is a graph showing some hunting conditions experienced while the vehicle is driving at a low speed, in each of which condition the engine rotational speed Ne chases the target engine rotational speed Neo.

FIG. 14 shows how the engine rotational speed Ne follows the target engine rotational speed Neo in this control when the throttle is closed completely (throttle opening TH=0). The change of the target engine rotational speed Neo is represented by a real line, and the engine rotational speed Ne, which follows the target engine rotational speed Neo, is represented by a broken line A. In addition, the change of the engine rotational speed Ne without such control as a prior art is represented by an alternate long and short dash line B. Also, as a reference, the change of the engine rotational speed Ne when the proportional term gain Pg is increased without any increase in the integral term gain Ig is represented by a two-dot chain line C. It is clear from this graph that the control of the present invention improves the response of the engine rotational speed Ne to follow the target engine rotational speed Neo above the level of the prior-art control (one-dot chain line B). Also, the graph shows that, in the control which increases the proportional term (two-dot chain line C), the engine rotational speed Ne nears the target engine rotational speed Neo rapidly at the beginning, but thereafter it comes into a hunting condition.

The above description is given of a control system for a vehicular transmission. However, the present invention is not limited to this type of transmission. Though the above transmission comprises an engine whose transmission. Though the above transmission comprises an engine whose drive force is assisted by the operation of an electrical motor M, the present invention can be implemented also with a transmission which does not incorporate an electrical motor. Not only the above mentioned metal V-belt type continuously variable transmission but also other types of continuously variable transmission, for example, a swash plate type continuously variable transmission, which uses a fluid as the medium to change the speed change ratio continuously, can be utilized for the implementation of the present invention. Furthermore, the engine rotational speed Ne may be set in correspondence to conditions of the vehicle other than the vehicle speed V and the throttle opening TH as in the above embodiment.

The deviation DNe achieved at Step S102 in the above described control may alternate to a positive value and to a negative vale with elapse of time. If this happens, then the value of the proportional term P also alternates positive and negative. To ignore the proportional term P whose period of positive and negative alteration is shorter than a predetermined value (in other words, whose alteration frequency is equal to or greater than a predetermined frequency), a process to function as a low-pass filter may be arranged additionally between Step S102 and Step S103. However, in this case, preferably, the value of the proportional term P before the filtering be used for the integration (calculation of the integral term I) at Step S103.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 11-198482 filed on Jul. 13, 1999, which is incorporated herein by reference.

What is claimed is:

1. A control system for a power transmission used for driving a vehicle, said power transmission including an engine and a continuously variable transmission which conveys a driving force with a speed change from said engine to wheels of said vehicle, said control system comprising;

idling elimination control means which stops said engine when said vehicle is brought into a halt; and speed change control means which calculates a target engine rotational speed in consideration of a driving condition of said vehicle and varies a speed change ratio of said continuously variable transmission such that a rotational speed of said engine follows said target engine rotational speed, wherein, while said vehicle is being decelerated with a throttle provided in said engine being closed, said control system, while terminating fuel supply to said engine, directs said speed change control means to vary said speed change ratio to a substantially LOW ratio such that said speed change control means makes said rotational speed of said engine follow said target engine rotational speed at a control speed which is faster than a control speed applied when said throttle is open, said control speed being defined as the speed at which said speed change ratio is being varied and wherein said speed change control means controls speed change operation of said continuously variable transmission by a control value which includes an integral term, said integral term being determined as a cumulative sum of a deviation of said rotational speed of said engine from said target engine rotational speed.

2. The control system as set forth in claim 1, wherein, while said vehicle is being decelerated with said throttle being closed, said control system directs said speed change control means to vary said speed change a ratio to a substantially LOW ratio, and then when said vehicle comes into a halt, said control system, while maintaining a state of non-fuel supply to said engine, directs said idling elimination control means to stop said engine.

3. The control system as set forth in claim 2, wherein, if said speed change ratio is not yet adjusted to a substantially LOW ratio when said vehicle has come into a halt after deceleration with said throttle being closed, then said control system does not allow said idling elimination control means to stop said engine.

4. The control system as set forth in claim 1, wherein said power transmission further comprises an electric motor, which is connected to an output shaft of said engine, so that said electric motor assists said driving force of said engine.

5. The control system as set forth in claim 1, wherein said control value is a sum of a proportional term and said integral term, said proportional term being determined based on said deviation of said rotational speed of said engine from said target engine rotational speed, and wherein when said throttle is closed while said vehicle is driving, said integral term is set to a larger value and said control speed is set faster than when said throttle is open.

6. The control system as set forth in claim 1, wherein said continuously variable transmission comprises a V-belt type continuously variable speed change mechanism, and wherein said speed change control means varies said speed change ratio by controlling a shift thrust which adjusts widths of drive and driven pulleys incorporated in said belt type continuously variable speed change mechanism.

* * * * *